> United States Patent [19]

Groesbeck et al.

[11] Patent Number: 4,902,528
[45] Date of Patent: Feb. 20, 1990

[54] PREPARATION OF DRIED PRECOOKED RICE PRODUCT

[75] Inventors: Cheryl Groesbeck, Shelton; Jau Y. Hsu, Brookfield; Gary J. Larson, New Milford, all of Conn.

[73] Assignee: Nestec S.A., Vevey, Switzerland

[21] Appl. No.: 224,817

[22] Filed: Jul. 27, 1988

Related U.S. Application Data

[63] Continuation of Ser. No. 84,621, Aug. 12, 1987, abandoned.

[51] Int. Cl.$^4$ ............................................... A23L 1/18
[52] U.S. Cl. .................................... 426/625; 426/460; 426/462
[58] Field of Search ............... 426/461, 462, 460, 618, 426/625

[56] References Cited

U.S. PATENT DOCUMENTS 2,696,156  12/1954  Campbell et al. .................. 426/462
3,083,102  3/1963   Carcassnne-Le duc ............ 426/461
3,086,867  4/1963   Miller ................................... 426/461
3,157,514  11/1964  Gorozpe .............................. 426/461
3,694,226  9/1972   Howland et al. .................... 426/507

Primary Examiner—Donald E. Czaja
Assistant Examiner—Mary S. Mims
Attorney, Agent, or Firm—Vogt & O'Donnell

[57] ABSTRACT

A dried precooked rice product is prepared by cooking rice grains for obtaining a moisture content of from 55% to 75% by weight and then by drying the cooked rice grains at a temperature of from 140° C. to 185° C. in two stages, firstly under stationary conditions to a moisture content of from 20% to 35% and secondly under agitated conditions to a moisture content of from 3% to 15%, for providing a precooked dried rice produce having a bulk density of from 37 g/100 cm to 42 g/100 cm. 100 g of the rice product so produced is capable of absorbing from 195 g to 225 g of boiled hot water in 10 minutes rehydration in 500 g of boiled hot water.

17 Claims, No Drawings

PREPARATION OF DRIED PRECOOKED RICE PRODUCT

BACKGROUND OF THE INVENTION

The present invention relates to a process for the production of a convenient rice product, more particularly to a pre-cooked rice product that requires no cooking for consumption.

There are basically three kinds of commercial parboiled rice products:

(1) Regular parboiled rice this is prepared for consumption by cooking (simmering) for about 20 minutes and the product has a good texture. However, the time taken to prepare this product for consumption is rather long and depending on the amount of water used and the heating conditions, the texture is not always consistent and, therefore, the product is not particularly convenient to use.

(2) Quick cooking parboiled is 85-95% gelatinised and is produced by partial cooking and drying of regular parboiled rice. This product also requires cooking (simmering) for consumption but, as the time required is only about 5-10 minutes, it is more convenient to use than regular parboiled rice. However, depending on cooking conditions, the water absorption of rice is usually varied and consequently, the rice texture is not consistent. It also requires attention during cooking and, therefore, it is not really convenient.

(3) Instant is 95-100% gelatinised and is usually produced by complete cooking of the rice followed by low temperature drying (50°-65° C.) to a moisture content of about 10% and then high temperature drying (180°-350° C.) for a high degree of puffing. This type of rice is more convenient than quick cooking rice because it is reconstituted for consumption by rehydrating in boiled hot water for a period of from only about 1 to 5 minutes. The high degree of puffing is carried out because of the requirement of instant rehydration but, because of this high degree of puffing, the rice structure is usually damaged and, consequently, the texture of the product is not good.

It would be very desirable to produce a convenient rice product which can be reconstituted simply and quickly like instant rice while still possessing the good texture of regular cooked rice. Up to the present time, this has not been achieved because fast rehydration requires a change of the rice structure and texture. In order to maintain the good rice structure, it is important that the rehydration time is at least 8 minutes, preferably at least 9 or 10 minutes.

SUMMARY OF THE INVENTION

We have found, surprisingly, that a mildly-puffed convenient rice product, having a good and constant texture when reconstituted to a palatable state by rehydration, can be produced by a process which does not involve a high degree of puffing of low moisture cooked rice and which can be reconstituted for consumption simply by rehydrating in boiled, hot water and allowing to stand for a minimum of about 8 minutes and preferably a minimum of 9 or 10 minutes. Since there is no high puffing step, the rice has a better texture than conventional instant rice. Compared with quick cooking rice, since cooking and attention are not required in the preparation for consumption, not only is it more convenient to use but the texture and quality of the rice product are also more constant.

Puffing can be defined as the expansion of rice grain size and this can be expressed by the bulk density which is measured by weighing the loose weight of dried rice in a 100 ml graduated cylinder. It is essential that the mildly-puffed convenient rice product of the present invention has a bulk density of from 37 to 42 and preferably from 38 to 41 g/100 cc. In addition, to achieve a palatable state on reconstitution, 100 g of the product of the present invention should absorb from 195 to 225 g of water after 10 minutes rehydration in 500 g hot water which has just been boiled without any further heating, which we shall refer to in this invention as "boiled, hot water". In contrast, non-puffed quick cooking rice usually has a bulk density of from 43 to 50 g/100 cc and absorbs less water during rehydration while highly-puffed instant rice usually has a bulk density of from 30 to 36 g/100 cc and absorbs more water after 1 to 5 minutes rehydration.

According to the present invention there is provided a process for the production of a convenient precooked rice product characterized in that rice grains are cooked with water at a temperature and for a time sufficient that their moisture content is from 55% to 75% by weight and dried at a temperature from 140° C. to 185° C. in two stages, firstly under stationary conditions to a moisture content of from 20 to 35% and secondly under agitated conditions to a moisture content of from 3 to 15%, such that the dried rice has a bulk density of from 37 to 42 g/100 cm. For obtaining a palatable product upon rehydration, the dried product is rehydrated in boiled, hot water for a minimum of 8 minutes.

Any type of rice grain can be used, for example, milled white rice (long or short grain), arborio rice, or basmati rice, but the process of this invention is particularly advantageous for parboiled rice.

In addition to the hereinabove described methods of preparing these rice products for consumption, i.e., regular parboiled rice, quick cooking parboiled rice, instant rice and the convenient rice prepared by the process of the present invention, all these rice products can, if desired, be prepared for consumption by microwave cooking. The time required for microwave cooking ranges from about 2 to 20 minutes depending upon the degree of rice gelatinisation, rice puffing, variety of rice and the amount of rice and water used during microwave cooking. For example, to prepare the convenient rice produced by the process of the present invention for consumption in a microwave oven as utilized commonly in the home, it is possible to cook 120 g rice with 230 cc water at high power in 5 minutes and 240 g rice with 460 cc water at high power in 8 minutes. These times are shorter than those required for regular or quick-cooking parboiled rice, and the convenient rice produced by the process of the present invention has a better texture than instant rice after preparation for consumption by microwave cooking because of the optimum puffing of the rice.

DETAILED DESCRIPTION OF THE INVENTION

The cooking may be carried out by boiling the rice grains in water, steaming, or by a combination of boiling and steaming. Superatmospheric pressure may be used, if desired. The temperature of the cooking may be from 90° C. to 110° C. and preferably from 95° C. to 105° C. and the duration of the cooking may be from 5 to 20 minutes. The pH during cooking may conveniently be from 3.0 to 7.5. Preferably, for a product which is to be prepared for consumption by heating in boiled, hot water, the pH during cooking is from 6.5 to 7.5, while for a product which is to be prepared for consumption by microwave cooking the pH during cooking is preferably from 3.0 to 5.5, especially 3.5 to 5.0. Optionally, the rice grains may be soaked in water prior to cooking.

Drying in two stages, first under stationary and then under agitated conditions at from 140° C. to 185° C. in each stage, is critical for obtaining the required bulk density which results in the water absorption properties which provide the excellent rehydrated texture of the convenient precooked rice product of the present invention when rehydrated for the stated time. In both drying steps the cooked rice is preferably dried at a temperature from 145° C. to 180° C. and especially from 150° C. to 175° C.

In the first drying step, the cooked rice is preferably dried to a moisture content of from 23 to 35%. The drying under stationary conditions may be carried out on a regular belt dryer or on a high velocity belt dryer with nozzle tubes that produce hot air.

When the rice is dried in a regular, hot air belt dryer, it is conveniently fed onto the dryer in a thin layer. The thickness of the layer of rice grains on the belt may be from 2 to 10 mm and preferably from 3 to 6 mm. The velocity of the hot air is conventional and is usually from 10 to 20 meters per minute. The duration of the first drying step in a regular belt dryer to obtain the required moisture content is usually from 10 to 20 minutes and preferably from 12 to 18 minutes depending on the drying temperature used and velocity of the hot air.

When the rice is dried in a high velocity hot air dryer, the cooked rice may be dried by passing the hot air through a layer of cooked rice, which has preferably been dewatered, for instance by suction, to remove some surface moisture. The thickness of the layer of cooked rice is conveniently from 5 to 12 mm thick, and the drying time may be from 2 to 8 minutes, preferably from 3 to 7 minutes. The velocity of the hot air preferably ranges from 100 to 200 meters/min.

After the first drying step, the partially dried rice cake is broken and the rice separated. The dewatering step which advantageously precedes the first drying step when using a high velocity hot air dryer can reduce the stickiness of the cooked rice and enables a thicker layer of rice to be dried. In particular, the dewatering step can reduce the sticking of rice cooked at a pH of 6.5 to 7.5.

In the second drying step, the partially dried rice grains are preferably dried to a moisture content of from 6% to 12% by weight. The drying under agitated conditions may be carried out in a vibrating dryer such as a vibrating fluid bed dryer or a high velocity belt dryer with nozzle tubes that produce hot air similar to the one used in the first drying step. The velocity of the hot air generally ranges from 20 to 200 meters/min and the drying time is usually from 30 to 120 seconds. Preferably, the velocity of the hot air in the second drying step is not greater than that in the first drying step.

In both drying steps, the temperature, hot air flow and times are adjusted to create a rice product with the required bulk density, optimum water absorption and texture after about 10 minutes rehydration with boiled, hot water. The duration of the cooking time also affects the bulk density, water absorption and texture and for longer cooking times, the drying temperature and/or hot air velocity are advantageously lower, while for shorter cooking times, the drying temperature and/or hot air velocity are advantageously higher. Compared with conventionally puffed rice which is usually dried at a lower temperature for a longer time (e.g., 50° C. for 2 hours) to a moisture content of about 10% and then puffed at a high temperature for a short period of time (e.g., 180°–350° C. for a few seconds) the rice prepared by the process of the present invention is only mildly puffed and has good texture. In addition, the rehydration and the water absorption is improved by the longer rehydration time of at least 8, 9 or preferably 10 minutes for conventionally puffed rice.

Another advantage of the present invention is that by drying at a temperature of from 140° C. to 185° C. instead of at a lower temperature, e.g., about 50° C. to 60° C., as for conventionally puffed rice, the rice need not be cooked completely in the boiling step, thus reducing cooking losses which can amount to about 10% or more. The cooking is further completed in the drying step at temperatures from 140° C. to 185° C. in the present invention.

The present invention also provides a convenient rice product whenever produced by a process hereinbefore described.

It should be understood that although the product of this invention may be reconstituted by rehydrating with boiled, hot water in 8 minutes, the texture of the reconstituted product is superior when the rehydration time is 10 minutes or more. However, reconstitution times appreciably longer than 10 minutes reduce the convenience of the product.

EXAMPLES

The following Examples further illustrate the present invention.

EXAMPLE 1

1000 g parboiled rice were boiled in water at pH of 7.0 for 15 minutes, rinsed with cold water and drained to give a total weight of 2840 g (68.5% moisture). The rice was then placed in a layer of 5 mm on a Proctor & Schwartz's hot air belt dryer with a hot air velocity of 12 meters/min and dried at 175° C. for 12 minutes whereupon the moisture content was reduced to 32%, after which the rice grains did not stick together. The partially dried rice was then placed on a Witte's vibrating, fluid bed dryer in a layer of 8 mm and dried at 175° C. for 1 minute to a moisture content of 8–10%. The dehydrated rice had a bulk density of 40 g/100 cc. 180 g of this rice product was prepared for consumption by adding to 500 cc boiled, water and allowed to stand for 10 minutes 376 g water was absorbed and the product had a good, tender, firm, even texture.

COMPARATIVE EXAMPLE A 180 g of regular parboiled rice were prepared for consumption by boiling for 20 minutes in 500 cc water. 500 g water were absorbed. Because the cooked rice was not rinsed, it was softer and more starchy than the reconstituted product of Example 1.

COMPARATIVE EXAMPLE B

A quick cooking parboiled rice was prepared by boiling 1000 g parboiled rice for 15 minutes to 68.5% moisture, and then drying at 50° C. for 2 hours. The dehydrated rice had a bulk density of 43 g/100 cc 180 g of this product were prepared for consumption by adding to 1000 cc of boiling water and simmering for 10 minutes. 344 g water were absorbed but the product had a more grainy and slightly undercooked texture when compared with the reconstituted product of Example 1.

COMPARATIVE EXAMPLE C

An instant parboiled rice was prepared by boiling 1000 g parboiled rice for 20 minutes to 70% moisture, then drying in a hot air dryer at 50° C. for 3 hours and finally puffing at 240° C. for 10 seconds. The dehydrated rice had a bulk density of 32 g/100 cc 180 g of this instant parboiled rice were prepared for consumption by adding to 500 cc boiled, hot water and allowing to stand for 5 minutes. 415 g water were absorbed but the product had a broken rice texture and had no structural characteristic of rice.

EXAMPLE 2

1000 g parboiled rice were boiled in water with pH of 7.0 for 15 minutes, rinsed with cold water and drained to give a total weight of 2840 g (68.5% moisture). The cooked rice was then dewatered for one minute by placing the rice under force of suction. The rice was then placed in a hot air dryer (12 mm thick) with a jet-tube nozzle (Wolverine's Jetzone dryer), the hot air velocity was 150 meters/min and the temperature was 150° C. After drying for 5 minutes to a moisture content of 25%, the partially dried rice cake was then broken, the rice was separated and dried again at the same temperature and velocity for 45 seconds. The dehydrated rice had a bulk density of 39 g/100 cc 180 g of this rice was added to 500 cc boiled, hot water and allowed to stand for 10 minutes. 374 g water was absorbed and the product had a good, tender firm, even texture.

COMPARATIVE EXAMPLE D

By following a similar procedure to that described in Example 2, but where the velocity of hot air used was 75 meters/min and pre-drying time was 10 minutes, the dehydrated rice had a bulk density of 44 g/100 cc and 180 g of rice absorbed 340 g boiled, hot water after 10 minutes. The rehydrated rice texture was hard and grainy.

COMPARATIVE EXAMPLE E

By following a similar procedure to that described in Example 2, but where the hot air velocity was 450 meters/min and the pre-drying time was 3 min, the dehydrated rice had a bulk density of 36 g/100 cc and 180 g of this rice absorbed 410 g boiled, hot water after 10 minutes. The texture of the rehydrated rice was soft and had no structural characteristics of rice. The same rice was rehydrated for only 7 min, the water absorbed was 317 g but the texture was still soft.

COMPARATIVE EXAMPLE F

By following a similar procedure to that described in Example 2, but where the drying temperature was 190° C. and the pre-drying time was 4 min, the dehydrated rice had a bulk density of 35 g/100 cc of this rice absorbed 412 g boiled, hot water after 10 minutes. The texture of the rehydrated rice was soft and had no structural characteristics of rice.

EXAMPLE 3

By following a similar procedure to that described in Example 2, but using regular long grain, milled rice instead of the parboiled rice (the white rice was boiled for 12 minutes instead of 15 minutes for parboiled rice), the dehydrated rice had a bulk density of 37 g/100 cc and 180 g of this rice absorbed 364 g of boiled, hot water after 10 minutes. The rehydrated rice had a good, tender, firm texture better than some commercial instant white rices which required 5 or 7 minutes rehydration.

EXAMPLE 4

By following a similar procedure to that described in Example 2, but using arborio rice instead of the parboiled rice (the arborio rice was boiled for 12 min instead of 15 min for parboiled rice), the dehydrated arborio rice had a bulk density of 38 g/100 cc and 180 g of this rice absorbed 365 g of boiled, hot water after 10 minutes. The rehydrated rice had the good, tender texture typical of cooked arborio rice.

EXAMPLE 5

By following a similar procedure to that described in Example 1 but wherein the pH of the boiling water was 4.0 instead of 7.0 there used, the dehydrated rice produced had a bulk density of 40 g/100 cc b 120 g of this rice product was prepared for consumption by cooking with 230 g of water in a microwave oven (high power) for 5 minutes and the product had a good, tender, firm even texture and an attractive white color.

EXAMPLE 6

By following a similar procedure to that described in Example 2 but wherein the pH of the boiling water was 4.5 instead of 7.0 there used, the dehydrated rice produced had a bulk density of 40 g/100 cc 120 g of this rice product was prepared for consumption by cooking with 460 g of water in a microwave oven (high power) for 8 minutes and the product had a good tender, firm, even texture and an attractive white color.

We claim:

1. A process for producing a dried precooked rice product comprising cooking rice grains with moisture at a temperature and for a time sufficient for providing cooked rice grains having a moisture content of from 55% to 75% by weight and then drying the cooked rice grains at a temperature of from 140° C. to 185° C. in two stages, firstly under stationary conditions to a moisture content of from 20% to 35% and secondly under agitated conditions to a moisture content of from 3% to 15%, for providing a dried precooked rice product having a bulk density of from 37 g/100 cm to 42 g/100 cm.

2. A process according to claim 1 wherein the cooked rice is dried in the first stage of drying with a belt dryer providing hot air for drying the cooked rice.

3. A process according to claim 2 wherein the hot air has a velocity of from 10 meters per minute to 20 meters per minute.

4. A process according to claim 3 wherein the cooked rice lies in a layer of from 2 mm to 10 mm thick on a belt of the dryer and is dried for from 10 minutes to 20 minutes.

5. A process according to claim 2 wherein the hot air has a velocity of from 100 meters per minute to 200 meters per minute.

6. A process according to claim 5 wherein the cooked rice has been dewatered to remove surface moisture prior to drying.

7. A process according to claim 5 wherein the cooked rice lies in a layer of from 5 mm to 12 mm thick on a belt of the dryer and is dried for from 3 minutes to 7 minutes.

8. A process according to claim 1 wherein the cooked rice is dried to a moisture content of from 23% to 35% in the first stage of drying.

9. A process according to claim 1, wherein the cooked rice forms a cake upon first stage drying, further comprising breaking the cake and separating the rice gains for second stage drying.

10. A process according to claim 2 further comprising rinsing the cooked rice, draining the rinsed rice and, wherein the cooked rice forms a cake upon first stage drying, further comprising breaking the cake and separating the rice grains for second stage drying.

11. A process according to claim 1 wherein the first stage dried rice is dried in the second stage of drying with a dryer selected from a group of dryers consisting of a vibrating dryer and a belt dryer providing hot air at a velocity of from 20 meters per minutes to 200 meters per minute.

12. A process according to claim 11 wherein the first stage dried rice is dried for from 30 seconds to 120 seconds in the second stage drying.

13. A process according to claim 1 wherein the first stage dried rice is dried to a moisture content of from 6% to 12% in the second stage drying.

14. A process according to claim 1 wherein the rice grains are cooked at a pH of from 3 to 7.5.

15. A process according to claim 1 wherein the rice grains are cooked at a pH of from 3 to 5.

16. A process according to claim 1 wherein the rice grains are cooked by a method selected from a group consisting of boiling and steaming and combinations thereof.

17. A process according to claim 16 wherein the rice grains are cooked at temperatures of from 90° C. to 110° C. for from 5 minutes to 20 minutes.

* * * * *

UNITED STATES PATENT AND TRADEMARK OFFICE
CERTIFICATE OF CORRECTION

PATENT NO. : 4,902,528
DATED : February 20, 1990
INVENTOR(S) : Cheryl GROESBECK, et al.

It is certified that error appears in the above-identified patent and that said Letters Patent is hereby corrected as shown below:

On the title page, item [57]:
Lines 8-9 of the ABSTRACT, "produce" should read --product--.

Column 1, line 13, delete "this".

Column 1, line 21, after "parboiled" insert --rice--.

Column 1, line 31, after "Instant " insert --rice--.

Column 4, line 53, insert a period after --minutes--.

Column 4, line 67, insert a period after --cc--.

Column 5, line 11, insert a period after --cc--.

UNITED STATES PATENT AND TRADEMARK OFFICE
CERTIFICATE OF CORRECTION

PATENT NO. : 4,902,528
DATED : February 20, 1990
INVENTOR(S) : Cheryl GROESBECK, et al.

It is certified that error appears in the above-identified patent and that said Letters Patent is hereby corrected as shown below:

Column 5, line 31, insert a period after --cc--.

Column 6, line 24, delete the "b" after --cc-- and insert a period.

Column 6, line 34, "40" should read "39" and insert --.-- (a period) after "cc".

Column 7, line 11, (line 4 of claim 9), "gains" should read "grains".

Column 8, line 1, (line 5 of claim 11), "minutes" should read (minute).

Signed and Sealed this

Fifth Day of February, 1991

Attest:

HARRY F. MANBECK, JR.

*Attesting Officer*   *Commissioner of Patents and Trademarks*